US006559225B1

(12) United States Patent
Irle et al.

(10) Patent No.: US 6,559,225 B1
(45) Date of Patent: May 6, 2003

(54) POLYURETHANE DISPERSIONS

(75) Inventors: Christoph Irle, Dormagen (DE); Wolfgang Kremer, Kerken (DE); Günther Ruf, Krefeld (DE); Rolf Roschu, Willich (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/030,029

(22) PCT Filed: Jun. 20, 2000

(86) PCT No.: PCT/EP00/05649

§ 371 (c)(1),
(2), (4) Date: Feb. 27, 2002

(87) PCT Pub. No.: WO01/02455

PCT Pub. Date: Jan. 11, 2001

(30) Foreign Application Priority Data

Jul. 5, 1999 (DE) .......................................... 199 30 961

(51) Int. Cl.$^7$ ............................................... C08G 18/36
(52) U.S. Cl. .................... 524/839; 524/840; 428/423.1; 528/74.5
(58) Field of Search ................................ 524/839, 840; 428/423.1; 528/74.5

(56) References Cited

U.S. PATENT DOCUMENTS

| 4,277,380 | A | | 7/1981 | Williams et al. | ......... 260/18 TN |
|---|---|---|---|---|---|
| 5,004,779 | A | | 4/1991 | Blum et al. | .................. 524/591 |
| 5,039,732 | A | | 8/1991 | Arora | .......................... 524/591 |
| 5,252,696 | A | | 10/1993 | Laas et al. | ..................... 528/49 |
| 5,500,475 | A | | 3/1996 | Eicken et al. | ................ 524/591 |
| 5,986,119 | A | * | 11/1999 | O'Lenick | |
| 6,359,023 | B1 | * | 3/2002 | Kluth et al. | |

FOREIGN PATENT DOCUMENTS

| CA | 2148550 | 11/1995 |
|---|---|---|
| EP | 0 640 632 | 3/1995 |
| EP | 0 709 414 | 5/1996 |
| JP | 6-340842 | 12/1994 |
| WO | 97/19120 | 5/1997 |

OTHER PUBLICATIONS

Advances in Urethane Science & Technology, K.C. Frisch, D. Klempner (eds), vol. 10, (month Unavailable) 1987, pp. 121–162, Waterborne Polyurethanes, James W. Rosthauser and Klaus Nachtkamp.

Database WPI, Section Ch, Week 199534, Derwent Publications Ltd., London, GB; AN 1995–261323, XP002151723 & JP 07 165885 A (Dainippon Ink & Chem. Inc.), Jun. 27, 1995.

* cited by examiner

*Primary Examiner*—Rachel Gorr
(74) *Attorney, Agent, or Firm*—Joseph C. Gil; Thomas W. Roy

(57) ABSTRACT

This invention relates to binders for aqueous coatings, to a process for the production thereof and to the use thereof for lacquers and coatings.

9 Claims, No Drawings

POLYURETHANE DISPERSIONS

BACKGROUND OF THE INVENTION

This invention relates to binders for aqueous coatings, to a process for the production thereof and to the use thereof for lacquers and coatings.

Aqueous coating compositions are increasingly being used instead of systems containing solvent with the objective of reducing emissions of organic solvents. Polyurethane dispersions comprise one important class of aqueous lacquer binders. D. Dieterich provides an overview in *Prog. Org. Coatings* 9, 281 (1981). Polyurethane dispersions combine the important properties of resistance to chemicals and mechanical stress. It is thus advantageous to use polyurethane dispersions, especially for coating surfaces exposed to severe mechanical stress.

Resistance to the damage caused by shoe heels on floor coatings (heel marking resistance) is of particular interest. Especially in the case of markedly thermoplastic coatings, such heel marks give rise to permanent damage. Resistance to such damage may be improved by crosslinking the floor coating.

One method of achieving such an improvement to the range of properties is to use hydrophilised polyisocyanates, as are described for example in EP-B-0 540 985. Aqueous, two-component polyurethane lacquers achieve a very high level of properties. However, due to the comparatively complex application process for coating systems which are to be applied as two components, the range of applications thereof is limited, especially in the case of manual application.

One simple, previously described way of obtaining crosslinked coatings from polyurethane dispersions is to incorporate unsaturated units into the binder (*Advances in Urethane Science & Technology*, K. C. Frisch, D. Klempner (eds.), vol. 10, pp. 121–162 (1987)). Coatings prepared from such binders crosslink by reaction with atmospheric oxygen (autooxidative crosslinking). In comparison with combining a polyurethane dispersion with a hydrophilised polyisocyanate, this binder which is applied as a single component is in particular simpler to apply.

Such dispersions containing urethane groups and air-drying structural units are also described in EP-A-0 017 199, EP-B-0 379 007, WO97/19120, DE-A-4 004 651, DE-A-4 416 336, U.S. Pat. No. 5,039,732 and JP-A-6 340 842. One disadvantage of hitherto known autooxidatively crosslinkable polyurethane dispersions is, however, that the mechanical properties of the lacquer film do not achieve the high level achieved by purely physically drying polyurethane dispersions. This is manifested, for example, by poorer abrasion resistance.

Another possible process for the production of polyurethane dispersions containing unsaturated units is described in EP-A-0 709 414. Products having a defined content of C=C double bonds are obtained by using dehydrated castor oil as the OH component in the production of a polyurethane dispersion.

When dehydrating castor oil (c.f. for example K. T. Achaya, *J. Am. Oil Chem. Soc.* 48, p. 758 [1971]), a single C=C double bond is produced for each molecule of water which is eliminated. The process described in EP-A-0 709 414 is thus limited by the fact that, by dehydrating castor oil having a certain content of OH groups and double bonds, the products obtained always have the same total number of hydroxyl groups and double bonds. Using this process, it is thus not possible to produce products having an elevated content of double bonds and simultaneously an elevated content of OH groups.

The object of the present invention was to provide polyurethane dispersions obtainable in simple manner which may be applied to yield coatings having excellent heel marking resistance simultaneously combined with excellent abrasion resistance.

This object is achieved according to the invention by polyurethane dispersions in which the polyurethanes contain certain unsaturated polyester oligomers and are obtainable using a simple production process by transesterification from castor oil. The dispersions may be applied to yield particularly high grade floor coatings. In addition to elevated resistance to water/ethanol mixtures and to abrasion, these coating are distinguished by heel marking resistance.

SUMMARY OF THE INVENTION

The present invention provides polyurethane dispersions, characterised in that 5 to 50% of a polyurethane oligomer (A) are used as one of the structural components, which oligomer is obtainable from AI) 30–85%, preferably 50–70%, of castor oil fatty acid, AII) 10–60%, preferably 25–35%, of one or more carboxylic acids having 8 to 30 C atoms and 0 to 4 C=C double bonds and AIII) 3–20%, preferably 5–15%, of one or more alcohols with an average functionality of 2.5 to 3.5 wherein the percentages are by weight and add up to 100%.

The further constituents which are required for synthesis of the PU dispersions according to the invention are known and frequently described in the literature. These constituents comprise B) 5–60% of polyisocyanates, C) 0.5–40% of polymeric polyols having average molecular weights of 500 to 6000, D) 0–10% of monoalcohols and/or monoamines, E) 0.5–15% of polyols, aminopolyols and/or polyamines having a molecular weight of below 500, wherein one of these polyols or polyamines preferably contains an ionic group or should be capable of forming an ionic group, which may be cationic or anionic, and F) 0–10% of OH— and/or NH-functional, nonionic, hydrophilic polyoxyalkylene ethers, wherein the percentages are by weight and add up to 100%.

DETAILED DESCRIPTION OF THE INVENTION

The carboxylic acids (AII) are preferably aliphatic and cycloaliphatic monocarboxylic acids such as for example 2-ethylhexanoic acid, lauric acid, stearic acid, oleic acid, linoleic acid or linolenic acid. The acids particularly preferably comprise fatty acid mixtures as may be obtained from natural vegetable or animal oils, such as for example soya oil, peanut oil, tall oil, linseed oil, wood oil, sunflower oil or castor oil, optionally with further chemical and/or physical modification.

Alcohols (AIII) are difuncional alcohols such as ethylenglycol, diethylenglycol, 1,4-butanediol, neopentyl glycol, 1,2-propanediol, 1,3-propanediol or 2-ethylhexanediol, trifunctional alcohols such as glycerol or trimethylolpropane, or higher functional alcohols such as pentaerythrol. Preferred alcohol (AIII) is glycerol. The average functionality (i.e. the arithmetical average based on molar concentration of alcohols (AIII)) is between 2.5 and 3.5, preferred 3.0.

Suitable polyisocyanates (B) are preferably diisocyanates of the formula $R^1(NCO)_2$, wherein $R^1$ means an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms. Examples of such preferably used diisocyanates are tetramethylene diisocyanate, hexamethylene diisocyanate, 4,4'-diisocyanatodiphenylmethane, 2,4'-diisocyanatodiphenylmethane, 2,4-diisocyanatotoluene, 2,6-diisocyanatotoluene or α,α,α',α'-tetramethyl-m- or -p-xylylene diisocyanate, together with mixtures of the stated diisocyanates. Particularly preferred diisocyanates are 1-diisocyanato-3,3,5-trimethyl-5-isocyanatomethylcyclohexane (isophorone diisocyanate) and 4,4'-diisocyanatodicyclohexylmethane.

Those polyisocyanates having isocyanurate, biuret, allophanate, uretidione or carbodiimide groups are furthermore suitable as the polyisocyanates (B). Such polyisocyanates may have elevated functionalities, for example of greater than 3. Further polyisocyanates suitable for the production of the polyurethane dispersions suitable according to the invention are those having nonionic or ionic, hydrophilic structural components and are conventionally used as crosslinking agents in aqueous two-component PU lacquers.

The polymeric polyols (C) within the molecular weight range from 500–6000 are those which have long conventionally been used for the production of polyurethanes. They have an OH functionality of at least 1.8 to approx. 4. These comprise, for example polyesters, polyethers, polycarbonates, polyester carbonates, polyacetals, polyolefins, polyacrylates and polysiloxanes. The stated polyols are preferably used in a molecular weight range from 800 to 2500 with an OH functionality of 1.9 to 3. Polyethers are particularly preferably used.

In addition to the use of difunctional OH components, the polyurethane prepolymer may, as is known from the literature, be terminated with a monofunctional alcohol or amine (D). Preferred compounds (D) are aliphatic monoalcohols or monoamines having 1–18 C atoms, with ethanol, n-butanol, ethylene glycol monobutyl ether, 2-ethylhexanol, 1-octanol, 1-dodecanol, 1-hexadecanol or di-N-alkylamines particularly preferably being used.

Polyols, aminopolyols or polyamines (E) having a molecular weight of below 500, which may be used as chain extenders in polyurethanes or polyurethane dispersions, have also been described in large numbers in the relevant literature. Examples which may be mentioned are: ethanediol, 1,4-butanediol, cyclohexanedimethanol, trimethylolpropane, glycerol, as well as hydrazine, ethylenediamine, 1,4-diaminobutane, isophoronediamine and 4,4-diaminodicyclohexylmethane.

Low molecular weight compounds according to (E), which contain anionic groups or are capable of forming an ionic group are, for example, dimethylolpropionic acid, hydroxypivalic acid, reaction products of (meth)acrylic acid and polyamines (c.f. for example DE-A-19 750 186) or polyol components containing sulfonate groups, such as for example the propoxylated addition product of sodium hydrogen sulfite onto 2-butenediol or the polyesters synthesised from salts of sulfoisophthalic acid described in WO98/06768. OH-functional compounds which contain cationic groups or units convertible into cationic groups, such as for example N-methyldiethanol-amine, are also suitable.

The polyurethane dispersions according to the invention may furthermore contain polyoxyalkylene ethers (F), each molecule of which bears at least one hydroxy or amino group and which consist, for example, of an alcohol and polyethylene oxide/polypropylene oxide blocks having a molecular weight of 250 to approx. 3000. Given a sufficient content of these nonionic hydrophilic compounds, it is also possible to dispense with using ionic, hydrophilic compounds according to (E).

The present invention furthermore provides a process for the production of polyurethane dispersions, characterised in that a polyester oligomer is initially produced by esterification and/or transesterification from castor oil, one or more alcohols and unsaturated fatty acids or from castor oil and one or more triglycerides, which preferably have an iodine value of >50, and a polyurethane dispersion is then prepared from this preliminary product.

The process according to the invention for the production of the polyester oligomer (A) is performed in such a manner that the starting materials are heated to elevated temperatures of for example 200–250° C., preferably in the presence of a catalyst. The course of the esterification or transesterification reaction may, for example, be monitored by gel chromatography. Catalysts which may be considered are the basic or acidic catalysts described in the literature (H. Zimmermann, *Faserforsch. Textiltech.* 13, p. 481 [1962]), for example sodium hydroxide, lithium hydroxide, lead oxide, lithium acetate, organotitanium, organozirconium, organozinc and organotin compounds. Basic catalysts such as alkali metal hydroxides are preferably used.

Preferably the polyester oligomer (A) is produced by transesterification of castor oil and drying oils with an iodine number >50, particularly preferred soybean oil.

The aqueous PU dispersions are produced in the known conventional manner: the polyisocyanate component is allowed to react to completion with polymeric polyol and low molecular weight chain extenders to yield a polyurethane, wherein optionally and advantageously a solvent is also used which may optionally subsequently be separated.

Suitable solvents are the per se known conventional lacquer solvents, such as for example ethyl acetate, butyl acetate, ethylene glycol monomethyl or monoethyl ether acetate, 1-methoxy-2-propyl acetate, 3-methoxy-n-butyl acetate, acetone, 2-butanone, 4-methyl-2-pentanone, cyclohexanone, toluene, xylene, chlorobenzene, mineral spirits, mixtures primarily containing relatively highly substituted aromatics, as are commercially available for example under the names Solvent Naphtha, Solvesso® (Exxon), Cypar® (Shell), Cyclo Sol® (Shell), Tolu Sol® (Shell), Shellsol® (Shell), carbonic acid esters, such as dimethyl carbonate, diethyl carbonate, 1,2-ethylene carbonate and 1,2-propylene carbonate, lactones, such as β-propiolactone, γ-butyrolactone, ε-caprolactone and ε-methylcaprolactone, as well as solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

In a further step, groups capable of neutralisation are converted into the salt form by neutralisation and the dispersion is produced with water. Depending upon the degree of neutralisation, the dispersion may be adjusted to a very finely divided state, such that it virtually has the appearance of a solution, but very coarsely divided states are also possible, which are likewise sufficiently stable. The solids content may also be varied within broad limits from, for example 20–50%.

Excess isocyanate groups are then reacted with polyfunctional isocyanate-reactive compounds (chain extension). To this end, water or polyamines are preferably used, particularly preferably di- and triamines and hydrazine. Termination with a monoamine, such as for example diethylamine, dibutylamine, ethanolamine, N-methylethanolamine or N,N-diethanolamine is also possible.

The polyurethane dispersions according to the invention are used either alone or in combination with other aqueous binders. Such aqueous binders may, for example, be synthesised from polyester, polyacrylate, polyepoxide or polyurethane polymers. Combination with radiation-curable binders, as are described for example in EP-A-0 753 531, is also possible and a preferred use of the polyurethane dispersions according to the invention. It is furthermore possible to modify the polyurethane dispersions according to the invention with polyacrylates. To this end, olefinically unsaturated monomers such as esters and/or amides of (meth)acrylic acid and alcohols having 1–18 C atoms, styrene, vinyl esters or butadiene are emulsion polymerised, as for example described in DE-A-1 953 348, EP-A-0 167 188, EP-A-0 189 945 and EP-A-0 308 115, in the presence of the polyurethane dispersion. The monomers may contain functional groups such as hydroxyl or acetoacetoxy groups as well as one or more olefinic double bonds.

It is furthermore possible to add crosslinking agents prior to application. Hydrophilic and hydrophobic polyisocyanate crosslinking agents are preferred for this purpose.

The polyurethane dispersions according to the invention are preferred as binders in coatings and adhesives. Coatings based on the polyurethane dispersions according to the invention may be applied onto any desired substrates, for example wood, cork, metal, plastics, paper, leather, textiles, felt, glass or mineral substrates. One particularly preferred application is for coating wooden and plastics flooring, cork flooring and mineral flooring.

The polyurethane dispersions may be used as such or in combination with auxiliary substances and additives known from lacquer technology, such as for example extenders, pigments, solvents, levelling agents, to produce coatings. Driers may be added to accelerate oxidative crosslinking.

The coating materials may be applied by known methods, for example by brushing, pouring, knife coating, spraying, roller coating or dipping. The lacquer film may be dried at room temperature or elevated temperature, but may also be stoved at temperatures of up to 200° C.

EXAMPLES

Polyester Oligomer Precursor 1

3200 g of castor oil and 1600 g of soya oil are weighed out with 2.4 g of dibutyltin oxide into a 5 liter reactor with distillation attachment. A stream of nitrogen (5 l/h) is passed through the reactants. The temperature is raised to 240° C. within 140 minutes. After 7 h at 240° C., the temperature is reduced. The OH value is 89 mg of KOH/g, the acid value 2.5 mg of KOH/g.

Polyester Oligomer Precursor 2

3200 g of castor oil and 1600 g of soya oil are weighed out with 2.4 g of lithium hydroxide into a 5 liter reactor with a reflux condenser. A stream of nitrogen (5 l/h) is passed through the reactants. The temperature is raised to 240° C. within 140 minutes. After 4 h at 240° C., the temperature is reduced. The OH value is 109 mg of KOH/g, the acid value 3.2 mg of KOH/g.

Polyester Oligomer Precursor 3

1650 g of castor oil, 90 g of glycerol, 813 g Edenor UKD 50 20 (Cognis) are weighed out with 12.5 g of dibutyltin oxide into a 5 liter reactor with a distillation column. A stream of nitrogen (5 l/h) is passed through the reactants. The temperature is raised to 200° C. within 12 hours. After 6 h at 200° C., the temperature is reduced. The OH value is 104 mg of KOH/g, the acid value 6.4 mg of KOH/g.

PU Dispersion 1

158 g of poly(tetrahydrofuran), MW 2000, 116 g of polyester oligomer precursor 1, 26 g of dimethylolpropionic acid, 22 g of 1,6-hexanediol and 163 g of N-methylpyrrolidone are heated to 70° C. and stirred until a clear solution is obtained. 121 g of Desmodur® W (Bayer AG) and 102 g of Desmodur® I (Bayer AG) are then added and heated to 100° C. Stirring is continued at this temperature until the NCO content is 4.3%. The temperature is then reduced to 70° C. and 19.3 g of triethylamine are added. 600 g of this solution are dispersed with vigorous stirring in 538 g of water, which is initially introduced at a temperature of 40° C. The temperature in the dispersion is held constant at 40° C. by cooling with an ice/water bath. After dispersion, the temperature is reduced to 30° C. A solution of 5.3 g of hydrazine hydrate and 10.1 g of ethylenediamine in 179 g of water is then added within 5 minutes. The isocyanate groups are completely consumed by reaction by raising the temperature to 65° C. until no NCO is any longer detectable by IR spectroscopy. After cooling to 30° C., the dispersion is filtered through a Seitz T5500 filter.

| Characteristics of the polyurethane dispersion: | |
|---|---|
| Average particle size: (laser correlation spectroscopy, LCS) | 57 nm |
| pH: | 8.3 |
| Solids content: | 35.5% |

PU Dispersion 2

339 g of poly(tetrahydrofuran), MW 2000, 248 g of polyester oligomer precursor 2, 70 g of dimethylolpropionic acid, 34 g of 1,6-hexanediol and 321 g of N-methylpyrrolidone are heated to 70° C. and stirred until a clear solution is obtained. 516 g of Desmodur® W (Bayer AG) are then added and heated to 100° C. Stirring is continued at this temperature until the NCO content is 4.1%. The temperature is then reduced to 70° C. and 52.6 g of triethylamine are added. 650 g of this solution are dispersed with vigorous stirring in 601 g of water, which is initially introduced at a temperature of 30° C. Stirring is continued for 5 minutes after dispersion. A solution of 3.9 g of hydrazine hydrate and 10.2 g of ethylenediamine in 200 g of water is then added within 5 minutes. The isocyanate groups are completely consumed by reaction by stirring the mixture at 45° C. until no NCO is any longer detectable by IR spectroscopy. After cooling to 30° C., the dispersion is filtered through a Seitz T5500 filter.

| Characteristics of the polyurethane dispersion: | |
|---|---|
| Average particle size: (laser correlation spectroscopy, LCS) | 33 nm |
| pH: | 8.8 |
| Solids content: | 36.0% |

PU dispersion 3

158 g of Desmophen® 2028 (Bayer AG), 115 g of polyester oligomer precursor 1, 25 g of dimethylolpropionic acid, 22 g of 1,6-hexanediol and 163 g of N-methylpyrrolidone are heated to 70° C. and stirred until a clear solution is obtained. 120 g of Desmodur® W (Bayer AG) and 102 g of Desmodur® I (Bayer AG) are then added and heated to 100° C. Stirring is continued at this temperature until the NCO content is 4.4%. The temperature is then reduced to 70° C. and 19.3 g of triethylamine are added. 600 g of this solution are dispersed with vigorous stirring in 539.3 g of water, which is initially introduced at a temperature of 40° C. The temperature in the dispersion is held constant at 40° C. by cooling with an ice/water bath. After dispersion, the temperature is reduced to 30° C. A solution of 17.6 g of ethylenediamine in 180 g of water is then added within 5 minutes. The isocyanate groups are completely consumed by reaction by raising the temperature to 65° C. until no NCO is any longer detectable by IR spectroscopy. After cooling to 30° C., the dispersion is filtered through a Seitz T5500 filter.

| Characteristics of the polyurethane dispersion: | |
|---|---|
| Average particle size: (laser correlation spectroscopy, LCS) | 110 nm |
| pH: | 8.7 |
| Solids content: | 35.9% |

PU Dispersion 4

181 g of poly(tetrahydrofuran), MW 2000, 133 g of polyester oligomer precursor 3, 37 g of dimethylolpropionic acid, 18 g of 1,6-hexanediol and 96 g of N-methylpyrrolidone are heated to 70° C. and stirred until a clear solution is obtained. 276 g of Desmodur® W (Bayer AG) are then added and heated to 100° C. Stirring is continued at this temperature until the NCO content is 4.4%. The temperature is then reduced to 70° C. and 20 g of triethylamine are added. 600 g of this solution are dispersed with vigorous stirring in 799 g of water, which is initially introduced at a temperature of 30° C. Stirring is continued for 5 minutes after dispersion. A solution of 6.6 g of hydrazine hydrate and 10.6 g of ethylenediamine in 89 g of water is then added within 5 minutes. The isocyanate groups are completely consumed by reaction by stirring the mixture at 45° C. until no NCO is any longer detectable by IR spectroscopy. After cooling to 30° C., the dispersion is filtered through a Seitz T5500 filter.

| Characteristics of the polyurethane dispersion: | |
|---|---|
| Average particle size: (laser correlation spectroscopy, LCS) | 77 nm |
| pH: | 8.3 |
| Solids content: | 35.1% |

Comparative Example 1

Polyurethane dispersion without oxidatively drying structural units 389 g of a polyester prepared from adipic acid, hexanediol and neopentyl glycol (hydroxyl value 112 mg of KOHWg), 28 g of neopentyl glycol, 39 g of dimethylolpropionic acid and 220 g of N-methylpyrrolidone are heated to 70° C. and stirred until a clear solution has formed. A mixture of 157 g of Desmodur® W (Bayer AG) and 199 g of Desmodur® I (Bayer AG) is then added. An exothermic reaction occurs. The batch is kept at 100° C. until the NCO content is 4.3 wt. %. The temperature is then reduced to 50° C. and 30 g of triethylamine are added and the mixture homogenised by 10 minutes' stirring. 850.0 g of the neutralised resin solution are then dispersed by stirring into 940 g of water at a temperature of 42° C. Stirring is continued for a further 5 minutes, then a solution of 9.2 g of ethylenediamine and 10.5 g of diethylenetriamine in 104 g of water are added within 20 minutes. The isocyanate groups are completely consumed by reaction by stirring the mixture at 45° C. until no NCO is any longer detectable by IR spectroscopy. After cooling to 30° C., the dispersion is filtered through a Seitz T5500 filter.

| Characteristics of the polyurethane dispersion: | |
|---|---|
| Average particle size: (laser correlation spectroscopy, LCS) | 58 nm |
| pH: | 8.0 |
| Solids content: | 34.9% |

Testing as Parquet Lacquer

Formulation of clear lacquers from polyurethane dispersions 1, 2, and 3 and from Comparative Example 1

A clear lacquer is formulated by adding the following constituents in each case to 100 parts by weight of the dispersion:

| Co-solvent: | ethylene glycol monobutyl ether/water 1:1 (10 parts by weight) |
|---|---|
| Defoamer: | Tego Foamex® 805 (Tego Chemie), as supplied (0.2 parts by weight) |
| Wetting agent: | Byk® 346 (Byk Chemie), as supplied (0.5 parts by weight) |
| Thickener: | Acrysol® RM8 (Rohm & Haas), 5% in water (1.0 part by weight) |

In order to determine film hardness (pendulum damping to DIN 53 157) and abrasion resistance (to DIN 53754; Taber Abraser, CS 10/1 kg/1000 revolutions), the lacquers are applied onto glass sheets to a wet film thickness of 200 μm. In order to determine resistance to water and ethanol (50% aqueous solution), the clear lacquers are applied in three coats (each of 100 g of lacquer/m$^2$) onto sheets of oak, drying then being performed in each case at room temperature. The lacquer surface is gently sanded before application of the $2^{nd}$ and $3^{rd}$ coats.

Resistance to water and ethanol is determined using the following method: cotton wool swabs saturated with the solvent are applied onto 7 day old lacquer films and covered with Petri dishes. After exposure for 24 hours (water) or 30 minutes (ethanol), the assessment is made once the wetted films have been carefully dried with kitchen paper. Damage is rated on a scale from 0 (no change) to 5 (severe damage, film dissolved).

Heel marking resistance is assessed by subjecting the film surface to impact with a conventional commercial repair shoe sole. Softening of the lacquer film and heel marking resistance is rated on a scale from 0 to 4:

| Value | Softening | Heel marking resistance |
| --- | --- | --- |
| 0 | Unchanged | unchanged |
| 1 | very slightly softer | slight trace discernible |
| 2 | somewhat softer | slight scratches discernible |
| 3 | easily damaged with a fingernail | scratches clearly discernible |
| 4 | can be wiped off | surface scuffed |

Test Results:

| | PU dispersion 1 | PU dispersion 2 | PU dispersion 3 | Comparative Example 1 |
| --- | --- | --- | --- | --- |
| Water resistance, 24 h | 0 | 0 | 0 | 0 |
| Ethanol/water, 5 min | 2 | 1 | 2 | 4 |
| Ethanol/water, 30 min | 3 | 2 | 3 | 4 |
| Abrasion, mg | 20 | 40 | 16 | 12 |
| Heel marking resistance | 1 | 2 | 1 | 4 |

The test results show the distinct improvement in heel marking resistance of PU dispersions 1, 2 and 3 according to the invention.

What is claimed is:

1. A polyurethane dispersion prepared from components comprising
   A) 5–50% of a polyester prepared from,
      AI) 30–85% of castor oil fatty acid,
      AII) 10–60% of one or more carboxylic acids having 8 to 30 C atoms and 0 to 4 C═C double bonds and
      AIII) 3–20% of one or more alcohols with an average functionality of 2.5 to 3.5,
   B) 5–60% of a polyisocyanate,
   C) 0.5–40% of a polymeric polyol having a number-average molecular weight of 500 to 6000,
   D) 0–10% of a monoalcohol and/or a monoamine,
   E) 0.5–15% of a polyol, an aminopolyol and/or a polyamine having a molecular weight of below 500, and
   F) 0–10% of an OH— and/or NH-functional, nonionic, hydrophilic polyoxyalkylene ether,
   wherein the percentages are by weight and add up to 100%.

2. The dispersion of claim 1 wherein component (A) is a polyester oligomer and component AIII) is glycerol.

3. The dispersion of claim 1 herein component (A) is prepared from
   50–70% of AI),
   25–35% of AII) and
   5–15% of glycerol.

4. The dispersion of claim 1 wherein component (B) comprises 4,4'-diisocyanatodicyclohexylmethane and/or isophorone diisocyanate.

5. The dispersion of claim 1 wherein component (C) comprises a polyether.

6. The dispersion of claim 1 wherein at least one compound of component (E) contains an ionic group or is capable of forming an ionic group.

7. A process for the production of the polyurethane dispersion of claim 1 comprising initially producing a polyester oligomer by transesterification from castor oil and one or more triglycerides, which have an iodine value of >50, and dispersing this preliminary product.

8. A binder for coatings and adhesives comprising the polyurethane dispersion of claim 1.

9. A floor coated with the polyurethane dispersion of claim 1.

* * * * *